United States Patent [19]

Gardner et al.

[11] Patent Number: 4,482,684
[45] Date of Patent: Nov. 13, 1984

[54] PROCESS FOR POLYMERIZATION OF VINYL MONOMERS WITH IMPROVED KINETIC RATE PROFILE

[75] Inventors: Keith L. Gardner; Richard A. Jones, both of Avon, Ohio

[73] Assignee: The B. F. Goodrich Company, Akron, Ohio

[21] Appl. No.: 426,048

[22] Filed: Sep. 28, 1982

Related U.S. Application Data

[63] Continuation-in-part of Ser. No. 258,978, Apr. 30, 1981, abandoned.

[51] Int. Cl.$^3$ ............................ C08F 2/38; C08F 2/20
[52] U.S. Cl. ...................................... 526/84; 526/210; 526/212
[58] Field of Search ...................... 526/84, 212, 210

[56] References Cited

U.S. PATENT DOCUMENTS

| | | | |
|---|---|---|---|
| 3,225,108 | 12/1965 | Sturgis | 526/212 |
| 3,502,269 | 3/1970 | Matthews | 526/212 |
| 3,642,756 | 2/1972 | Meeks | 526/212 |
| 4,245,073 | 1/1981 | Noël | 526/212 |

Primary Examiner—Christopher A. Henderson
Attorney, Agent, or Firm—Joe A. Powell; Alan A. Csontos

[57] ABSTRACT

This invention relates to the use of an organic compound which is a polymerization inhibitor in aqueous suspension polymerization systems for making polymers from olefinic monomers. The inhibitor is added to the aqueous medium prior to the start of or during the reaction. Its use allows a wide range of control throughout the increased reaction rate region and substantially reduces the tailpeak encountered during the aqueous suspension polymerization of olefinic monomers. One example of a suitable inhibitor is 2,2'- methylene bis (4,6-di-tertiary butylphenol).

4 Claims, No Drawings

PROCESS FOR POLYMERIZATION OF VINYL MONOMERS WITH IMPROVED KINETIC RATE PROFILE

This application is a continuation-in-part of Ser. No. 258,978 filed Apr. 30, 1981, now abandoned.

BACKGROUND OF THE INVENTION

When making homopolymers and copolymers of vinyl and vinylidene halides, and other polymerizable olefinic monomers, by means of the aqueous suspension polymerization technique, these polymerizations are generally exothermic and display a steadily increasing heat load. Frequently, this heat load becomes so severe late in the polymerization that the isothermal control is lost and the reaction "tailpeaks", or its temperature rises significantly above its set point. This tailpeak limits the amount of initiator and monomer, or monomers, which can be charged to the reactor, and therefore, limits the productivity of the reactor.

A number of methods have been heretofore proposed to overcome the difficulty of tailpeaks in vinyl monomer polymerization reactions. In the past, it has been proposed to polymerize at one temperature for a certain period of time and then change the temperature. While such a procedure has beneficial effects, it does not entirely solve the problem. Elaborate computer techniques have also been proposed but this type of equipment is expensive and difficult to install in a plant. Further, various compounds have been proposed to employ in the polymerization recipe which are, in effect, polymerization inhibitors under conventional conditions of temperature and pressure. Compounds of this nature, for this purpose, have been disclosed in U.S. Pat. No. 3,642,756. These materials work very well but it is felt that other materials or compounds, available commercially, might likewise accomplish the same result but in more efficient manner. Accordingly, it is a primary object of the present invention to provide a process for substantially eliminating the tailpeak during the preparation of homopolymers and copolymers of vinyl and vinylidene halides, and other polymerizable olefinic monomers by means of the aqueous suspension polymerization technique.

SUMMARY OF THE INVENTION

It has been found that a preferential radical trap does not affect the rate of polymerization up to the point of free monomer(s) disappearance in suspension polymerization systems but its use allows a wide range of control throughout the increased reaction rate region. Various organic compounds have been found which, when added to the polymerizaton recipe, during the polymerization reaction, substantially reduce the tailpeak encountered during the suspension polymerization of olefinic monomers. The effectiveness of the organic compounds is dependent on their chemical structure and solubility, which in turn determines their ability to control the polymerization reaction rate at the locus of polymerization.

DETAILED DESCRIPTION

The organic compounds which are effective for the purpose of the present invention are those which are capable of substantially inhibiting the polymerization of olefinic monomers at a polymerization temperature in the range of about 20° C. to about 80° C. and have the following general structure:

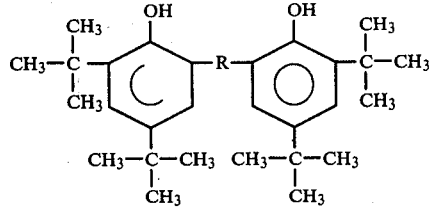

wherein R is an alkylidene radical containing 1 to 5 carbon atoms, either straight chained or branched. As examples of such organic compounds, there may be named, for example, 2,2'-methylene bis (4,6-di-tertiary butylphenol), 2,2'-ethylidene bis (4,6-di-tertiary butylphenol), and the like; and

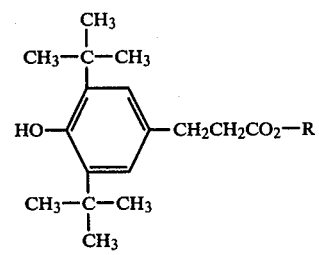

wherein R' is H or an alkyl group containing from 1 to 15 carbon atoms. As examples of such compounds, there may be named for example, 3-(3',5'-ditertiarybutyl-4'-hydroxy phenyl) propionic acid, ethyl 3-(3',5'-ditertiarybutyl -4'-hydroxy phenyl) propionate, and the like. The amount of the compound used will generally be in the range of about 0.001 part to about 0.01 part by weight based on the weight of 100 parts of monomer or monomers being polymerized. Preferably, the amount of the compound will be in the range of about 0.003 part to about 0.006 part by weight.

Quite surprising, it was found that not all phenol compounds would work satisfactorily in this invention. The compound Bisphenol A was found to be too effective and thus reduced the polymerization rate from the start of polymerizaton. Also the compound 3,5 ditert butyl-4hydroxy benzoic acid was not effective in reducing the tailpeak.

Normal suspension polymerization reactions are isothermal, that is, they are operated under conditions of constant temperature and are marked by changes of volume or pressure. Isothermal polymerizations show a steadily increasing reaction rate with conversion of monomer(s) to polymer, usually resulting in such a high heat load late in the polymerization that the isothermal control is lost and the reaction tailpeaks, that is, the reaction rate increases very rapidly. Under isothermal conditions, the average rate of reaction may be only 70% of that of the peak, so that during most of the reaction some of the heat removal capability goes unused. By use of the organic compounds or polymerization inhibibors of the present invention, the rate of polymerization up to the point of free monomer(s) disappearance is not affected and the use of said compounds allows a wide range of control throughout the increased reaction rate region. The addition of said compounds, either prior to the polymerization or during the polymerization reaction and prior to the tailpeak, effectively eliminates the polymerization tailpeak and permits the use of increased amounts of polymerization initiators. Surprisingly, the amount of cooling necessary to control the reactor temperature is reduced. Further, one can go to 70% to 80% or higher total conversion of monomer to polymer, depending upon the monomer(s) employed, the catalyst(s), and temperature of reaction.

It should be further pointed out that the organic compounds of the present invention can conveniently be incorporated into the polymerization reaction mixture in solid form at the beginning of the reaction. This is an important factor since it means that an operator does not have to make the decision to add the organic compound at some critical point where the reaction rate begins to increase. Further, the addition of the organic compounds of the present invention to the polymerization recipe allows one to react to a fixed monomer conversion without the addition of a shortstopping agent to terminate the reaction.

While the present invention is specifically illustrated hereinafter with regard to the suspension polymerization of vinyl chloride, it is to be understood that the process may likewise be applied in the suspension polymerization of any polymerizable ethylenically unsaturated monomer or monomers. Examples of such monomers are other vinyl halides and vinylidene halides such as vinyl bromide, vinylidene chloride, etc.; polymerizable olefinic monomers having at least one terminal $CH_2=C<$ grouping, such as esters of acrylic acid, for example, methyl acrylate, ethyl acrylate, butyl acrylate, octyl acrylate, cyanoethyl acrylate, and the like; vinyl acetate; esters of methacrylate, and the like; styrene and styrene derivatives, including $\alpha$-methyl styrene, vinyl toluene, chlorostyrene, and the like; vinyl naphthalene; diolefins including butadiene, isoprene, chloroprene, and the like; and mixtures of any of these types of monomers and other olefinic monomers copolymerizable therewith; and other polymerizable olefinic monomers of the types know to those skilled in the art.

The present invention, however, is particularly applicable to the suspension polymerization of vinyl chloride, either alone, or in admixture with one or more other polymerizable olefinic monomers having at least one terminal $CH_2=C<$ grouping, copolymerizable therewith in amounts as great as about 80% or more by weight of comonomer, based on the weight of the monomer mixture.

Among the initiators or catalysts that may be employed in the practice of the present invention are the free-radical catalysts or initiators, such as the alkanoyl, aroyl, alkaroyl and aralkanoyl peroxides and monohydroperoxides, azo compounds, peroxyesters, percarbonates, and the like. As examples of such catalysts, there may be named dibenzoyl peroxide, dilauroyl diperoxide, diacetyl peroxide, cumene hydroperoxides, methyl ethyl ketone peroxide, diisopropylbenzene hydroperoxide, 2,4-dichlorobenzoyl peroxide, naphthoyl peroxide, lauroyl peroxide, acetyl cyclohexane sulfonyl peroxide, t-butyl perbenzoate, di-t-butyl perphthalate, diisopropyl peroxydicarbonate, di(sec-butyl) peroxydicarbonate, and the like, azo-bis-isobutyronitrile, $\alpha,\alpha'$-azodiisobutyrate, and the like. The choice of any particular free-radical catalyst or initiator is dictated in part by the particular monomer or monomers to be polymerized and by the color requirements of the polymer. Further, more than one catalyst may be employed in the polymerization recipe. Usually, the amount of catalyst or catalysts employed will be in the range of about 0.01% to about 1.0% by weight, based on the weight of the monomer or monomers being polymerized. Preferably, the amount of catalyst(s) will be in the range of about 0.03% to about 0.5% by weight. When employing the organic compounds, or free radical traps, of the present invention it allows the use of catalysts which tend to have large reaction rate peaks under normal circumstances.

When polymerizing vinyl monomers, as set out hereinabove, by the suspension polymerization process, it is the general practice, and also advantageous, to add to the liquid reaction media a small amount of a dispersant. The purpose of the dispersant is to obtain a more complete and uniform dispersal of the monomer(s) and catalyst(s) throughout the reaction media prior to and during the polymerization of the monomer(s). Any of the well known dispersants operative in aqueous media may be employed. These include, among others, methyl cellulose, hydroxypropyl methyl cellulose, polyvinyl alcohol, dodecylamine hydrochloride, sodium lauryl sulfonate, lauryl alcohol, sorbitan monolaurate polyoxyethylene, nonylphenoxy polyoxyethylene ethanol, hydrolyzed polyvinyl acatetes, etc. The amount of dispersant employed will be in the range of about 0.001% to about 0.5% by weight, based on the weight of the monomer(s), to give satisfactory results. Preferably, however, the dispersant is employed in the range of about 0.01% to about 0.1% by weight.

In suspension polymerization the process is usually conducted at a temperature in the range of about 0° C. to about 100° C. depending upon the particular monomer or monomers being polymerized. However, it is preferred to employ temperatures in the range of about 40° C. to about 70° C., since, at these temperatures, polymers having the most all around beneficial properties are produced. The time of the polymerization will vary from about 2 to about 15 hours. However, when employing the organic compounds of the present invention, the time of polymerization will vary from about 3 to about 8 hours.

The suspension polymerization process may be carried out at autogenous pressures although superatmospheric pressures of up to 10 atmospheres or more may be employed with some advantage with the more volatile monomers. Superatmospheric pressures may also be employed with those monomers having the requisite volatilities at reaction temperatures permitting reflux cooling of the reaction mixture.

In addition to the above, the suspension polymerization process may be carried out utilizing a fully reactor technique. That is, the reaction vessel is completely filled with the polymerization medium and kept that way throughout the reaction cycle by constant addition thereto of water, or additional makeup liquid containing the monomer or monomers in the same proportion as at startup. Upon the addition of a certain predetermined amount of liquid, the polymerization reaction is terminated due to pressure drop and without the addition of a short-stopping agent. The necessity for the addition of liquid is due to the shrinkage in volume of the reaction medium produced by the conversion of the monomer or monomers to the polymeric state.

To further illustrate the present invention, the following specific examples are given. It is to be understood, however, that this is merely intended in an illustrative and not a limitative sense. In the examples, all parts and percents are by weight unless otherwise indicated.

EXAMPLE I

Two runs were made making polyvinyl chloride (PVC) by suspension polymerization in a 3 liter jacketed reactor equipped with an agitator. One run was the control and the other was made using a polymerization inhibitor of the invention. The recipes employed were as follows:

| Ingredient | Run 1 Control Parts | Run 2 Parts |
|---|---|---|
| Water (demineralized) | 192 | 192 |
| Vinyl Chloride | 100 | 100 |
| Polyvinyl alcohol (88% hydrolyzed PVA) | 0.075 | 0.075 |
| Lauroyl peroxide | 0.5 | 0.5 |
| 2,2'-methylene bis (4,6-di-tert-butylphenol) | — | 0.005 |

The water was added to the reactor and the agitator was turned on. Then the polyvinyl alcohol and lauroyl peroxide were added to the water and in Run 2, the inhibitor was also added at this point. After thorough mixing, the reactor was evacuated and the vinyl chloride was added to the reaction mixture. Thereafter, the reaction mixture was heated to 50° C. and held there throughout the entire polymerization reaction. During the reaction, water was continually added to compensate for the decrease in volume due to formation of polymer. When a quantity of water had been added to the reactor which was known to correspond to an approximate 85% yield of PVC, the reaction was stopped by manual shutdown procedure. The water addition rate throughout the reaction was recorded and the rate peak region was characterized by a signifiant increase in the water addition rate. Also the water addition rate at the rate peak was recorded and the PVC production rate was calculated after recovery of the polymer. The results were as follows:

| Run 1 | Rate peak | 536.7 minutes |
|---|---|---|
| | Water addition rate | 2.015 grams/minute |
| | PVC production rate during the rate peak. | 4.112 grams/minute |
| Run 2 | Rate peak | 553.8 minutes |
| | Water addition rate | 1.336 grams/minute |
| | PVC production rate during the rate peak. | 2.72 grams/minute |

From calculations based on these results, it was found that the rate peak in Run 2 with the inhibitor was diminished by 33.8% over that in the control Run 1, in terms of PVC production. This shows the substantial advantage of employing the polymerization inhibitors of the present invention to improve the kinetic rate profile in suspension polymerization reactions.

EXAMPLE II

In this example, three runs were made using the same apparatus and procedure employed in Example I. One run was the control and the other two were made using polymerization inhibitors of the invention. The recipes employed were as follows:

| Ingredient | Run 3 Control Parts | Run 4 Parts | Run 5 Parts |
|---|---|---|---|
| Water (demineralized) | 192 | 192 | 192 |
| Vinyl Chloride | 100 | 100 | 100 |
| Polyvinyl alcohol (88% hydrolyzed PVA) | 0.075 | 0.075 | 0.075 |
| Di-(secondary butyl) peroxydicarbonate | 0.035 | 0.035 | 0.035 |
| 3-(3',5'-ditertiarybutyl-4'-hydroxy phenyl) propionic acid | — | 0.0005 | — |
| Ethyl 3-(3',5'-ditertiarybutyl-4'-hydroxy phenyl) propionate | — | — | 0.005 |

Again as in Example I, the rate peak and the water addition rate at the rate peak were recorded and the PVC production rate was calculated after recovery of the polymer. The results were as follows:

| | Run 3 Control | Run 4 | Run 5 |
|---|---|---|---|
| Rate peak (minutes) | 442 | 450 | 460 |
| Water addition (grams/minute) | 1.515 | 1.250 | 1.298 |
| PVC production rate (grams/minute) during the rate peak | 3.091 | 2.551 | 2.648 |

From calculations based on these results, it was found that the rate peak in Run 4 was diminished by 17.4% over that in control Run 3 in terms of PVC production, and by 14.33% in Run 5 over Run 3. These results again show the advantage of employing the polymerization inhibitors of the present invention.

Among the advantages of the present invention, there may be mentioned that the use of the organic compounds or inhibitors helps reduce the amount of cooling necessary to control the reactor temperature. Also, the use of said compounds allows one to use cheaper catalysts which tend to have larger reaction rate peaks than the more expensive catalysts which tend to have smaller kinetic rate peaks. Further, the compounds can be added to the aqueous suspension medium, prior to reaction in solid form. This is important because it means that an operator does not have to make the addition of the compound at the critical point where the reaction rate begins to increase thus eliminating detrimental human error. Importantly, the addition of said compounds allows one to react to a fixed monomer(s) conversion without the addition of a shortstop to terminate the reaction. Other advantages of the present invention will be apparent to those skilled in the art.

Although the invention has been described in terms of its specific embodiments, certain modifications and equivalents will be apparent to those skilled in the art and are intended to be included within the scope of the present invention, which is to be limited only by the reasonable scope of the appended claims.

We claim:

1. In the process of aqueous suspension homopolymerization and copolymerization of vinyl monomer(s) in the presence of a polymerization initiator and a dispersant and at a temperature in the range of about 0° C. to about 100° C., the improvement which comprises adding to the aqueous suspension of vinyl monomer(s) during the polymerization thereof from about 0.001 part to about 0.01 part by weight, based on the weight of the monomer(s), of a polymerization inhibitor selected from the group consisting of 2,2'-methylene bis (4,6-di-tertiary butylphenol and 2,2'-ethylidene bis (4,6-di-tertiary butylphenol).

2. The process as defined in claim 1 wherein the monomer is vinyl chloride.

3. The process as defined in claim 2 wherein the inhibitor is 2,2'-methylene bis (4,6-di-tertiary butylphenol).

4. The process as defined in claim 2 wherein the inhibitor is 2,2'-ethylidene bis (4,6-di-tertiary butylphenol).

* * * * *